July 8, 1947.  C. A. MORRISON  2,423,718
STADIAMETRIC RANGE FINDER
Filed Feb. 20, 1946
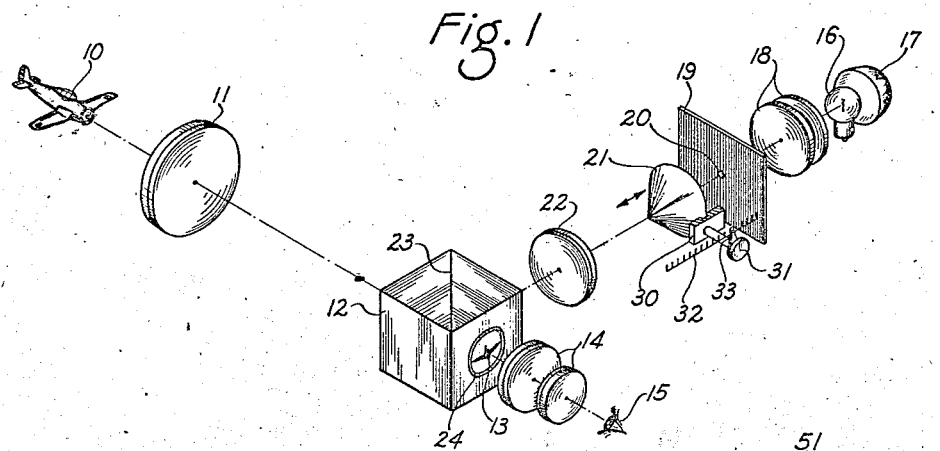
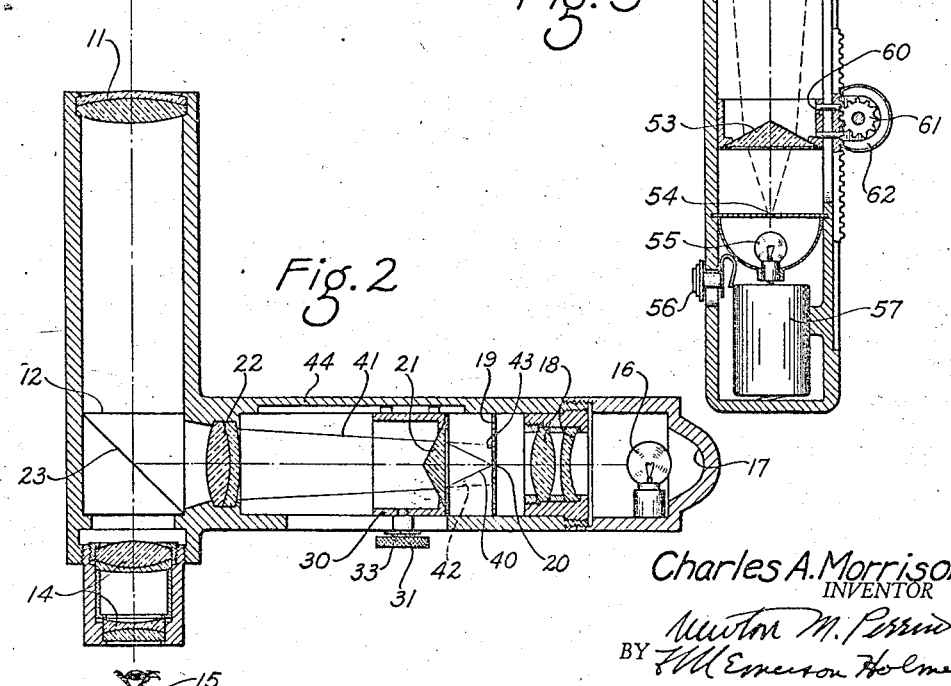
Charles A. Morrison
INVENTOR
BY
ATTORNEYS Patented July 8, 1947

2,423,718

UNITED STATES PATENT OFFICE 2,423,718

STADIAMETRIC RANGE FINDER

Charles A. Morrison, Rochester, N. Y., assignor to Eastman Kodak Company, Rochester, N. Y., a corporation of New Jersey Application February 20, 1946, Serial No. 648,973

2 Claims. (Cl. 88—2.3)

1

This invention relates to stadiametric range finders. A stadiametric range finder is one which is used for ranging on targets of known diameter such as a known ship or a known type of airplane. Effectively the range is measured in terms of the angle subtended by the target at the observer. In practice a reticle mark in the form of a ring or a pair of spaced dots is matched against an image of the target.

It is an object of the present invention to provide a simple, accurate and convenient device for providing a range reticle. In this sense, the purpose of the present invention is to provide a reticle producing means alternative to that described in U. S. 2,360,822 Altman.

Specifically it is the object of the present invention to provide a device for producing a complete ring of light of variable diameter. One particular advantage of the invention is the fact that the sensitivity or response of the instrument, that is to say, the amount of change of reticle diameter with movement of the adjusting mechanism, may be selected at will.

It is known that a point of light viewed through a solid cone of transparent refractive material will appear as a ring if the geometric axis of the cone passes through or near the point of light. According to the present invention this principle is applied to stadiametric range finders by using a cone of glass or other transparent material having very wide apex angle between 150° and 180° and by moving the cone nearer or farther from the spot of light in order to vary the apparent diameter of the ring of light. Optical means are provided for superimposing this ring of light on a real or virtual image of the target being ranged. The adjustment of the cone is thus a direct measure of the range of the target, provided of course that the diameter of the target itself is known as is necessary with all stadiametric ranging devices.

If the apex angle of the cone is nearly 180°, the diameter of the reticle changes very little as the cone is adjusted axially, whereas the response is much greater with cones having smaller apex angles. That is, the sensitivity and accuracy of the device is inversely proportional to the power of the conical lens.

The operation of the invention will be fully understood from the following description of the preferred embodiments thereof, when read in connection with the accompanying drawing in which:

Fig. 1 is a perspective view of an optical system incorporating one embodiment of the invention.

2

Fig. 2 is a plan view partly in section of the embodiment shown in Fig. 1.

Fig. 3 similarly illustrates another embodiment of the invention.

In Fig. 1 light from a target 10 to be ranged is focused by an objective lens 11 to form an image 13 on the rear surface of a beam combining block 12. This image may be viewed through an eyepiece 14 by the eye 15 of an observer. According to the present invention, light from a lamp 16 with a suitable reflector 17 and condenser lens 18 illuminates a small hole 20 in an opaque mask 19, the small hole 20 acting as a secondary source of light. A conical lens 21 causes this hole of light to appear as a ring except when the lens 21 is at the mask 19 itself, at which time this spot of course appears just as a spot. An image of the spot or ring is formed by lens 22 and semi-transparent reflecting surface 23, superimposed on the target image. In Fig. 1 this image of the ring is shown as 24. The operation of the conical lens 21 is perhaps best seen in Fig. 2, where the rays 40 after passing through the lens 21 appear as if coming from a ring 43. That is the rays 41 appear to come from this ring as indicated by the broken line 42. The ring is thus a virtual image of the spot, formed by the conical lens 21.

In order to provide adjustment of the diameter of this ring for stadiametric ranging, the conical lens 21 is carried in a mount 30 which is free to slide axially in the housing 44 of the range finder. Adjustment is made manually by moving the knob 31 which is connected through a slot in the housing to the lens mount 30. The knob 31 carries the pointer 33 which moves along a scale 32 on the housing. The range factor read from this scale gives the range directly when the diameter of the target is known. Calibration for various target diameters may be provided in any of the usual ways for example by a suitable graph. The scale 32 and index 33 are merely representative of the various forms of range indicative devices used in range finders. For example certain range finders feed the range data directly into some computing mechanism rather than to a scale to be read visually.

While Figs. 1 and 2 illustrate the preferred embodiment of the invention in which the ranging circle is superimposed on a real image of the target to be ranged, Fig. 3 shows an alternative arrangement in which the target is viewed relatively directly and a virtual image of the ranging circle is superimposed thereon. Light 50 from the target being ranged passes through a beam combiner 51 to the eye of the observer. Simultaneously with this light, the eye receives light from the reticle as collimated by an objective 52 and as formed into a ring by a conical lens 53 according to the invention. The spot of light is provided by an aperture 54 in an opaque mask illuminated by a flashlight lamp 55 which receives its power from a flashlight battery 57, the lamp being turned on and off at will by a suitable switch 56. The conical lens 53 in its mount 60 is carried on a suitable rack which engages a pinion 61 which in turn is rotated by a ranging knob 62. Strictly speaking, the observer does not see the target directly since he is looking through a light refractive material which carries the beam combiner 51 and hence it is proper to refer to the reticle image being superimposed on the target image. Alternatively it may be simpler to think of the term "target image" as being generic to the target itself as well as real and virtual images thereof and it is so used in this specification and the accompanying claims.

I claim:

1. A stadiametric range finder comprising a housing, means for viewing in a comparison plane an image of the target to be ranged, means carried in the housing for producing a small spot of light, a solid conical lens of transparent refractive material in line with light from the spot, the apex angle of the cone being between 150° and 180°, the axis of the cone being substantially aligned with said spot, means for holding the conical lens and for moving it axially in the housing to and from the spot of light whereby the spot appears through the cone as a ring of light of variable diameter, means including an objective for receiving light from the spot through the cone and for projecting an image of said ring in the comparison plane and range indicative means operated by said cone moving means.

2. A range finder according to claim 1 in which is included means for forming a real image of the target to be ranged in the comparison plane and an eyepiece for viewing the comparison plane.

CHARLES A. MORRISON.